(12) United States Patent
Jourdain et al.

(10) Patent No.: US 7,731,164 B2
(45) Date of Patent: Jun. 8, 2010

(54) VIBRATION DAMPER DEVICE COMPRISING A FLANGE RING CAPABLE OF COMING TO A STOP AGAINST A DAMPER UNIT

(75) Inventors: Stéphane Jourdain, Maurepas (FR); Olivier Godard, Les Ormes (FR); Jérôme Valliere, Les Ormes (FR); Pascal Morin, Chatellerault (FR)

(73) Assignee: Valeo Systemes d'Essuyage, La Verriere (FR)

( * ) Notice: Subject to any disclaimer, the term of this patent is extended or adjusted under 35 U.S.C. 154(b) by 86 days.

(21) Appl. No.: 11/791,897

(22) PCT Filed: Nov. 25, 2005

(86) PCT No.: PCT/EP2005/012630
§ 371 (c)(1),
(2), (4) Date: Mar. 24, 2008

(87) PCT Pub. No.: WO2006/058665
PCT Pub. Date: Jun. 8, 2006

(65) Prior Publication Data
US 2009/0019657 A1    Jan. 22, 2009

(30) Foreign Application Priority Data
Nov. 30, 2004    (FR)    .................................. 04 12704

(51) Int. Cl.
*F16F 7/00*    (2006.01)
(52) U.S. Cl. .................................................. 267/141.4
(58) Field of Classification Search ... 267/141.1–141.5, 267/273; 403/50, 56; 411/37–48, 508; 16/2.1; 15/250.31–250.46; 248/635
See application file for complete search history.

(56) References Cited

U.S. PATENT DOCUMENTS

| 4,865,792 | A | * | 9/1989 | Moyer | 264/249 |
| 5,829,730 | A | * | 11/1998 | Ott | 248/635 |
| 5,950,277 | A | * | 9/1999 | Tallmadge et al. | 16/2.1 |
| 6,098,949 | A | * | 8/2000 | Robinson | 248/635 |

FOREIGN PATENT DOCUMENTS

| FR | 2 750 099 | 12/1997 |
| FR | 2 853 606 | 10/2004 |
| FR | 2 855 478 | 12/2004 |
| WO | WO-00/53464 | 9/2000 |

* cited by examiner

*Primary Examiner*—Christopher P Schwartz
(74) *Attorney, Agent, or Firm*—Osha • Liang LLP

(57) ABSTRACT

The invention relates to a damping device, in particular for mounting a support plate (10) comprising a cylindrical damper unit (12) with a main axis (A) that comprises a top radial flange (20*s*) and a bottom radial flange (20*i*) which are cylindrical and each of which is accommodated by one side in a horizontal plate (18) of the plate (10), wherein the plate (10) comprises at least one cylindrical flange (26*s*, 26*i*) supported by the horizontal plate (18) which extends opposite the outer cylindrical surface (20*e*) of an associated flange (20*s*, 20*i*).

characterized in that the flange ring (26*s*, 26*i*) comprises a concave inner cylindrical surface (26*a*) which is capable of resting radially against a convex outer cylindrical surface (20*e*) of the flange (20*s*, 20*i*), in at least one overall horizontal direction.

7 Claims, 3 Drawing Sheets

VIBRATION DAMPER DEVICE COMPRISING A FLANGE RING CAPABLE OF COMING TO A STOP AGAINST A DAMPER UNIT

The invention provides a vibration damper device connecting the support plate of a windscreen-wiper mechanism to a body structure element of a motor vehicle.

The invention relates, more particularly, to a damping device, in particular for installing a support plate of a windscreen-wiper mechanism on a structure element, which comprises a cylindrical damper unit with a vertical main axis pierced by a central bore for the passage of an element for mounting the damper unit on the structure element, wherein the damper unit comprises a top radial flange and a bottom radial flange, both of which are cylindrical and accommodated on one side by a horizontal plate of the plate and which define between them an inner radial groove wherein the edge of an orifice that complements the plate is accommodated so as to ensure that the damper unit is supported with regard to the plate in the axial direction, and wherein the plate comprises at least one cylindrical vertical flange ring supported by the horizontal plate, which extends opposite the outer cylindrical surface of an associated flange.

Such a damper device is used to reduce the vibration produced by the windscreen-wiper mechanism and transmitted between the body of the vehicle and the plate of the wiping system, which mainly supports a gear reducer unit powering the wiping system.

Conventional damping devices are particularly well adapted for damping vibrations where the amplitude of movement of the plate with regard to the body of the vehicle is relatively small.

However, these dampers are not suitable for damping vibrations with a larger amplitude of movement.

When the wiping mechanism is subjected to these vibrations with a larger amplitude, it moves in relation to the body of the vehicle and in relation to the glass panel to be wiped, and the wiping area is therefore offset in relation to the optimum wiping area.

The windscreen-wiper device is not therefore capable of correctly restoring visibility for the driver.

The invention aims to provide a damping device that reduces the low-amplitude vibrations in a conventional manner and that also reduces vibrations with a larger amplitude.

With this aim, the invention provides a damper device as previously described, characterised in that the flange ring comprises a concave inner cylindrical surface that is capable of resting radially against a convex outer cylindrical surface of the flange, in at least one overall horizontal direction.

According to further characteristics of the invention:
- the damping device comprises at least one stop element arranged between the concave inner cylindrical surface of the flange ring and the outer cylindrical surface of the flange, which is capable of coming into simultaneous contact with the concave inner cylindrical surface of the flange ring and the outer cylindrical surface of the flange;
- the stop element is supported by the concave inner cylindrical surface of the flange ring and extends at a distance from the outer cylindrical surface of the flange;
- the stop element is supported by the convex outer cylindrical surface of the flange and extends at a distance from the concave inner cylindrical surface of the flange ring;
- the convex outer cylindrical surface of the flange and/or of the concave inner cylindrical surface of the flange ring supports a plurality of stop elements angularly distributed around the main axis.
- at least a part of the concave inner cylindrical surface of the flange ring is at least partially resting against the outer cylindrical surface of the flange.

Further characteristics and advantages of the invention will appear from reading the following detailed description, for the understanding of which the appended figures can be consulted, in which.

Figure 1:
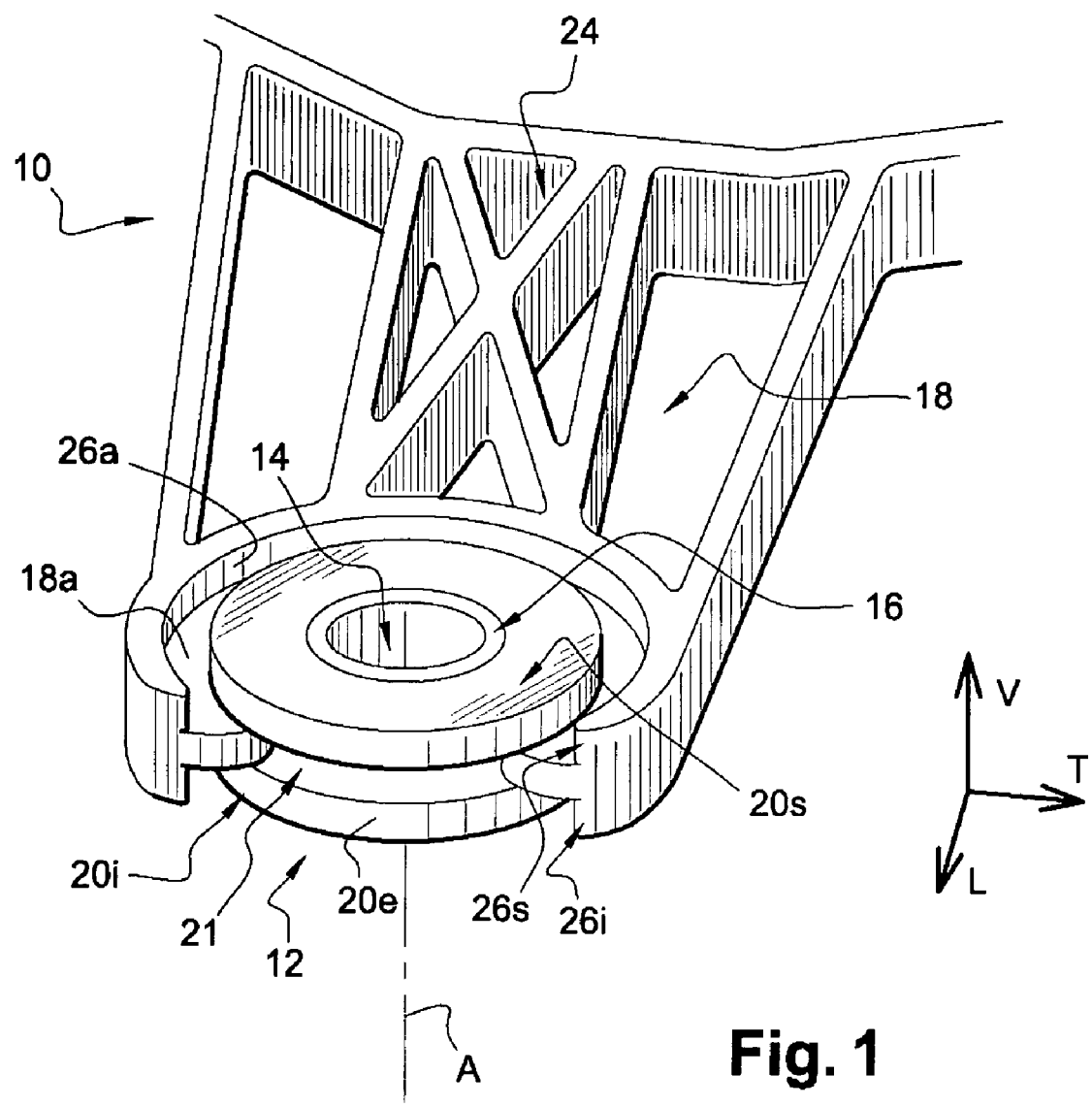
FIG. 1 is a diagrammatic perspective view of a damping device according to the prior art.

For the description of the invention, the orientations vertical, longitudinal and transversal will be adopted non-limitingly according to the reference frame V, L, T indicated in FIG. 1.

In the following description, identical, similar or analogous elements will be referred to using the same reference numbers.

The figures show a damping device for installing a plate 10 supporting a windscreen-wiper mechanism (not shown) on a body structure element of a motor vehicle (not shown) by means of a vibration damper unit 12.

The vibration damper unit 12, hereinafter referred to as "damper", has an overall cylindrical shape with a vertical main axis A, it comprises a cylindrical central bore 14, accommodating a complementary element 16 for mounting the damper 12 on the body structure element of the vehicle.

The plate 10 comprises a horizontal plate 18 with one free end 18a on which the damper 12 is mounted so as to hold the plate 18 on the damper 12.

For this purpose, the damper 12 comprises a cylindrical top radial flange 20s and a cylindrical bottom radial flange 20i which are accommodated vertically on either side of the end 18a of the plate 18, so as to define between them a groove 21 wherein the edge 22 of an orifice that complements the end 18a of the plate 18 is accommodated.

The horizontal plate 18 also comprises a series of rigidifying ribs 24, 26s, 26i that make it possible to limit the vertical deformations of the plate 18, among which a top rib or flange ring 26s is associated with the top flange 20s and a bottom flange ring 26i is associated with the bottom flange 20i.

The following description refers to a single flange ring 26s, 26i. It is understood that this reference to a single flange ring applies equally to the top flange ring 26s and to the bottom flange ring 26i.

The concave inner cylindrical surface 26a of the flange ring 26s, 26i extends vertically opposite the convex outer cylindrical surface 20e of the associated flange 20s, 20i.

Figure 2:
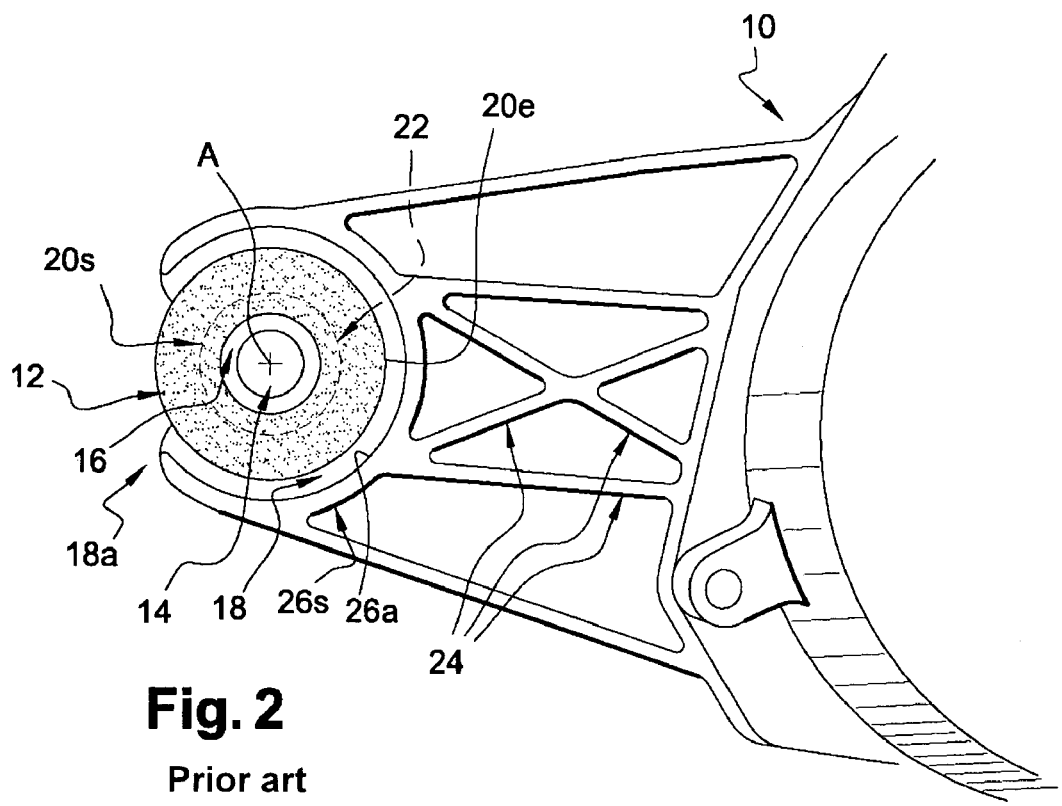
FIG. 2 is a top view of the damping device shown in FIG. 1.
Figure 3:
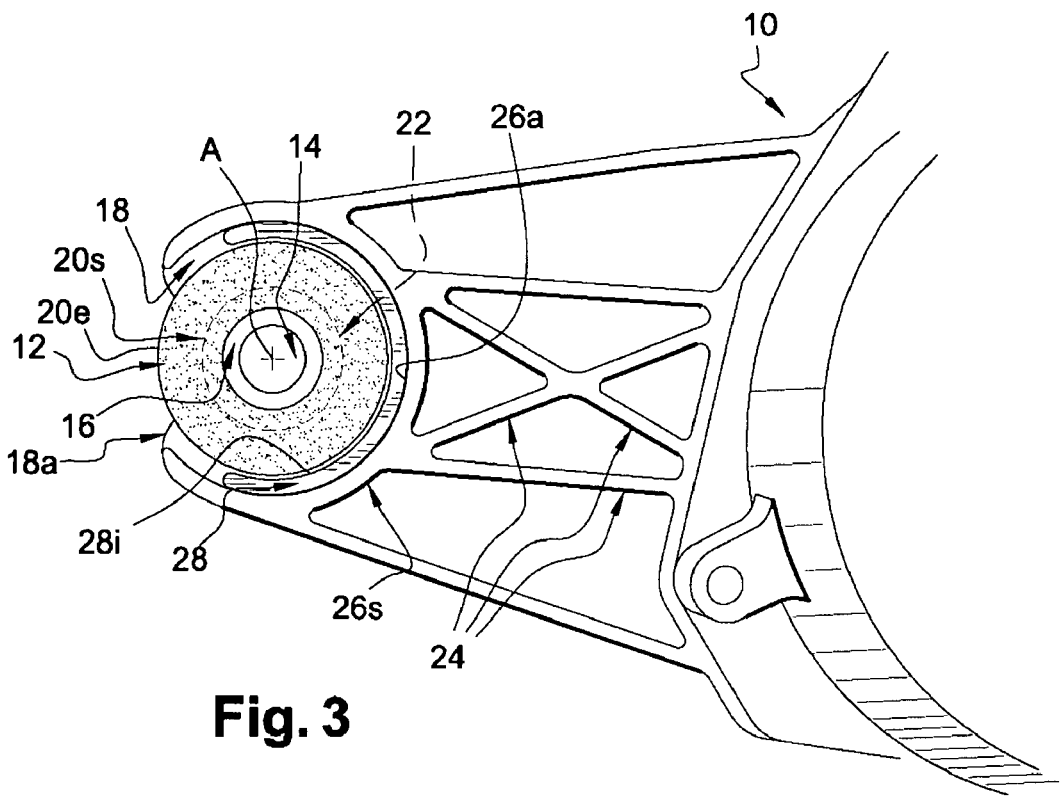
FIG. 3 is a view similar to that shown in FIG. 2, showing a damping device that supports a stop element according to the invention.

In a first embodiment shown in FIGS. 2 and 3, the damper 12 is radially inserted in the orifice of the plate 18, in relation to the main axis A.

For this reason, the orifice of the plate 18 opens onto the free end 18e of the plate 18, and the flange ring 26s, 26i forms a loop that is overall coaxial to the main axis A of the damper 12 which is open at the height of the opening of the orifice of the plate 18.

Figure 4:
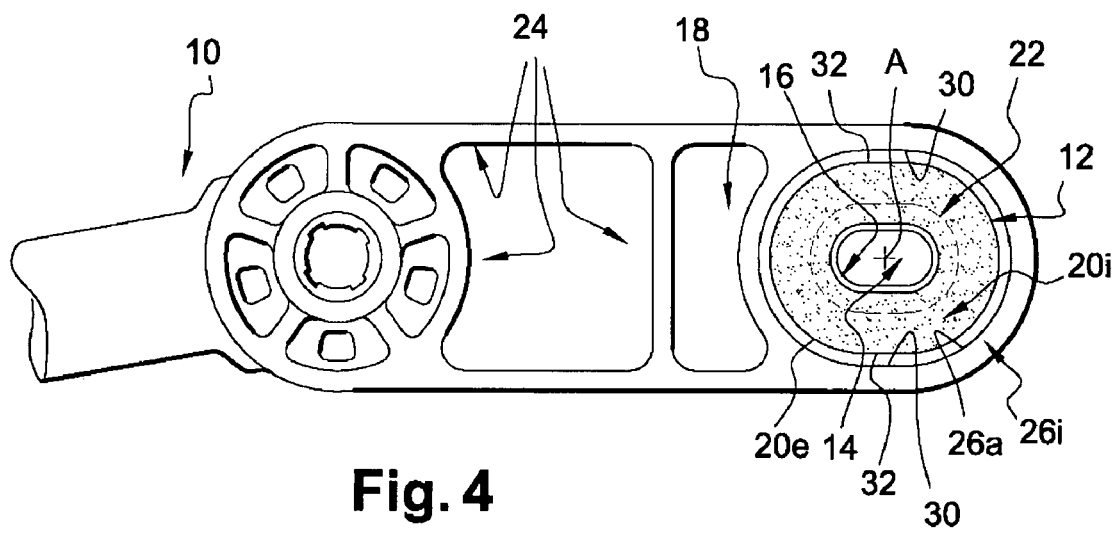
FIG. 4 is a view from below of a damping device according to the prior art.
Figure 5:
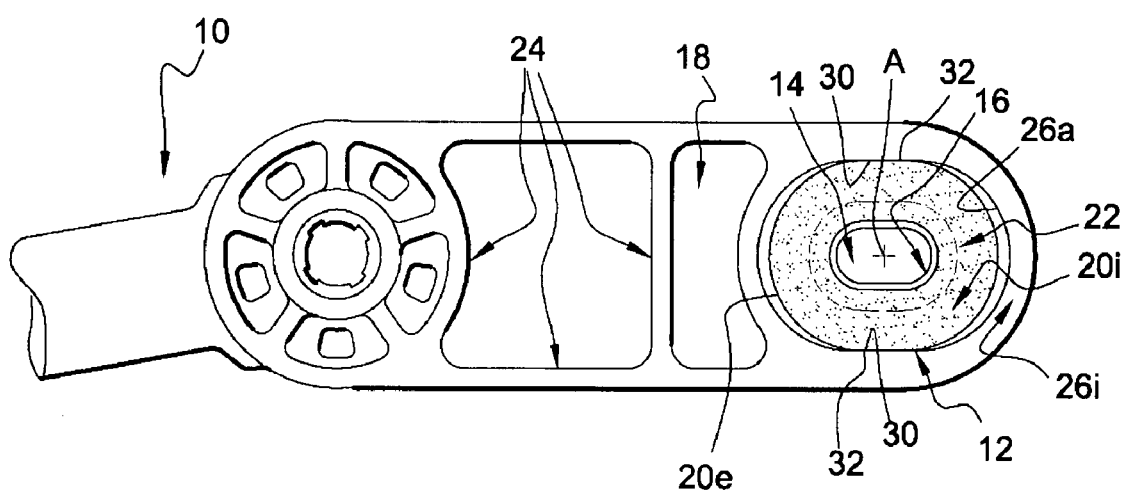
FIG. 5 is a view similar to that shown in FIG. 4, wherein the bottom flange is in contact with the flange ring.

In a second embodiment shown in FIGS. 4 and 5, the damper 12 is axially inserted in the orifice of the plate 18, the flange ring 26s, 26i then forming a closed loop peripheral to the associated flange 20s, 20i.

In the embodiments according to the prior art, shown in FIGS. 2 and 4, the concave inner cylindrical surface 26a of the flange ring 26s, 26i is radially separated from the convex outer cylindrical surface 20e of the associated flange 20s, 20i in relation to the main axis A.

s previously mentioned, such assemblies are particularly suited for damping vibration caused by a movement of the plate 10 in relation to the body structure element of the vehicle, which has relatively low amplitude.

According to the invention, and as shown in FIGS. 2 and 5, the top flange 20s and/or the bottom flange 20i are capable of coming to a stop against the associated flange ring 26s, 26i during a horizontal movement of the plate 10 in relation to the body structure element, with a relatively high amplitude, which is to say that the convex outer cylindrical surface 20e of the flange 20s, 20i is capable of coming to a stop against the concave inner cylindrical surface 26a opposite the flange ring 26s, 26i.

When the concave inner cylindrical surface 26a of the flange ring 26s, 26i is resting against the convex outer cylindrical surface 20e of the associated flange 20s, 20i, the flange 20s, 20i is capable of deforming elastically in order to dampen the movement of the flange ring 26s, 26i, and therefore of the plate 10 in relation to the body structure element.

According to a first aspect of the invention shown in FIG. 3, the arrangement comprises a stop element 28 arranged between the concave inner cylindrical surface 26a of the flange ring 26s, 26i and the convex outer cylindrical surface 20e of the associated flange 20s, 20i.

The stop element 28 thus reduces the radial play between the concave inner cylindrical surface 26a of the flange ring 26s, 26i and the convex outer cylindrical surface 20e opposite the associated flange 20s, 20i compared with the embodiment according to the prior art, which allows the flange ring 26s, 26i to come almost instantly to a stop against the associated flange 20s, 20i.

In this case, the stop element 28 is supported by the concave inner cylindrical surface 26a of the flange ring 26s, 26i, so that an inner cylindrical surface 28a of the stop element is capable of coming into contact with the convex outer cylindrical surface 20e of the flange 20s, 20i opposite it, when the concave inner cylindrical surface 26a of the flange ring 26s, 26i is resting against the convex outer cylindrical surface 20e of the flange 20s, 20i.

In an alternative embodiment of the invention (not shown), the stop element 28 is supported by the convex outer cylindrical surface 20e of the associated flange 20s, 20i, so that a convex outer cylindrical surface of the stop element 28, which extends opposite the concave inner cylindrical surface 26a of the flange ring 26s, 26i, is capable of coming into contact with the concave inner cylindrical surface 26a of the flange ring 26s, 26i when the flange ring 26s, 26i is resting against the flange 20s, 20i.

The stop element 28 is an added element mounted on the concave inner cylindrical surface 26a of the flange ring 26s, 26i or on the convex outer cylindrical surface 20e of the flange 20s, 20i, and which is fixed to the concave 26a or convex 20e surface by any known means, for example by gluing or overmoulding.

In addition, in the embodiment shown in FIG. 3, the stop element 28 forms an arc of circle centred on the main axis A of the damper 12.

The length of this arc of circle and its angular position around the main axis A define the horizontal direction in which the flange ring 26s, 26i is capable of coming to a stop against the associated flange 20s, 20i.

In an alternative embodiment of the invention, the concave inner cylindrical surface 26a of the flange ring 26s, 26i or the convex outer cylindrical surface 20e of the associated flange 20s, 20i supports a plurality of stop elements 28 angularly distributed around the main axis A of the damper 12, in which the length of the arc of circle formed by each stop element 28 is defined according to the horizontal directions in which the flange ring 26s, 26i is capable of coming to a stop against the associated flange 20s, 20i.

In another alternative embodiment of the invention, the stop element 28 is shaped so as to be simultaneously in contact with the opposing convex surface 20e of the flange 20s, 21 and concave surface 26a of the flange ring 26s, 26i, respectively.

In another embodiment of the invention shown in FIG. 5, the flange ring 26s, 26i and the associated flange 20s, 20i are shaped so that the concave inner cylindrical surface 26a of the flange ring 26s, 26i is at least partially resting against the convex outer cylindrical surface 20e of the associated flange 20s, 20i.

Thus, the damper 12 immediately dampens the movement of the plate 10 with regard to the body structure element.

In this case, the concave inner cylindrical surface 26a of the flange ring 26s, 26i and the convex outer cylindrical surface 20e of the associated flange 20s, 20i have an overall oblong shape, so that they each comprise two vertical longitudinal flat portions 30, 32, respectively, which are diametrically opposed in relation to the main axis A of the damper 12.

According to this embodiment of the invention, each flat portion 30 of the concave inner cylindrical surface 26a of the flange ring 26s, 26i is in contact with the opposite flat portion 32 of the convex outer cylindrical surface 20e of the associated flange 20s, 20i.

However, it is understood that the invention is not limited to this embodiment, and that the concave inner cylindrical surface 26a of the flange ring 26s, 26i and the convex outer cylindrical surface 20e of the associated flange 20s, 20i can also be in contact with each other at the level of their other non-flat portions, or even be in full contact with one another.

In addition, in a first embodiment of this aspect of the invention, wherein the concave inner cylindrical surface 26a of the flange ring 26s, 26i is in contact with the convex outer cylindrical surface 20e of the associated flange 20s, 20i, the flange 20s, 20i is identical to that defined in the embodiment according to the prior art, and only the flange ring 26s, 26i is different from that defined in the embodiment according to the prior art.

In a second embodiment of this aspect of the invention (not shown) wherein the concave inner cylindrical surface 26a of the flange ring 26s, 26i is in contact with the convex outer cylindrical surface 20e of the associated flange 20s, 20i, the flange ring 26s, 26i is identical to that defined in the embodiment according to the prior art, and only the flange 20s, 20i is different from that defined in the embodiment according to the prior art.

This therefore enables the use of standard elements for implementing the invention.

However, it is understood that the invention is not limited to these embodiments of the invention, and the flange ring 26s, 26i and the associated flange 20s, 20i can have a shape and/or dimensions that are different to those defined in the prior art without departing from the scope of the invention.

The preceding description of the invention is made in relation to flanges 20*s*, 20*i* and flange rings 26*s*, 26*i* with an overall circular (FIGS. 2 and 3) or oblong (FIGS. 4 and 5) shape. It is understood that the invention is not limited to these embodiments, and the flanges 20*s*, 20*i* and the flange rings 26*s*, 26*i* can have a different shape, for example oval or ovoid, without departing from the scope of the invention.

The same goes for the inner radial groove 21 and the edge 22 of the complementary orifice of the plate 18, which are overall circular (FIGS. 2 and 3) or oblong (FIGS. 4 and 5) in shape, and can have a different shape, for example oval or ovoid, without departing from the scope of the invention.

In addition, the damping device according to the invention was described as comprising a top flange ring 26*s* and a bottom flange ring 26*i*. However, it is understood that the invention is not limited to this embodiment, and the damping device can comprise a single top or bottom flange ring, 26*s* or 26*i* respectively, without departing from the scope of the invention. ,

The invention claimed is:

1. A damping device for installing a support plate of a windscreen-wiper mechanism on a structure element, comprising:
    a cylindrical damper unit with a vertical main axis pierced by a central bore for the passage of an element for mounting the damper unit on the structure element,
    wherein the damper unit comprises a top radial flange and a bottom radial flange, both of which are cylindrical and accommodated on one side by a horizontal plate of the plate and which define between them an inner radial groove wherein the edge of an orifice that complements the plate is accommodated so as to ensure that the damper unit is supported with regard to the plate in the axial direction, and
    wherein the plate comprises at least one cylindrical vertical flange supported by the horizontal plate which extends opposite the outer cylindrical surface of an associated flange,
    wherein the flange ring comprises a concave inner cylindrical surface which is capable of resting radially against a convex outer cylindrical surface of the flange, in at least one overall horizontal direction; and
    at least one stop element arranged between the concave inner cylindrical surface of the flange ring and the convex outer cylindrical surface of the flange, which is capable of resting simultaneously against the concave inner cylindrical surface of the flange ring and the convex outer cylindrical surface of the flange.

2. The device according to claim 1, wherein the stop element is supported by the concave inner cylindrical surface of the flange ring and extends at a distance from the convex outer cylindrical surface of the flange.

3. The device according to claim 2, wherein the convex outer cylindrical surface of the flange and/or the concave inner cylindrical surface of the flange ring supports a plurality of stop elements distributed angularly around the main axis.

4. The device according to claim 1, wherein the stop element is supported by the convex outer cylindrical surface of the flange and extends at a distance from the concave inner cylindrical surface of the flange ring.

5. The device according to claim 4, wherein the convex outer cylindrical surface of the flange and/or the concave inner cylindrical surface of the flange ring supports a plurality of stop elements distributed angularly around the main axis.

6. The device according to claim 1, wherein at least part of the concave inner cylindrical surface of the flange ring is at least partially resting against the external cylindrical surface of the flange.

7. The device according to claim 1, wherein the convex outer cylindrical surface of the flange and/or the concave inner cylindrical surface of the flange ring supports a plurality of stop elements distributed angularly around the main axis.

* * * * *